United States Patent
Kodama et al.

(10) Patent No.: US 8,187,765 B2
(45) Date of Patent: May 29, 2012

(54) MEMBRANE ELECTRODE ASSEMBLY AND POLYMER ELECTROLYTE MEMBRANE FUEL CELL

(75) Inventors: Kensaku Kodama, Nisshin (JP); Fusayoshi Miura, Nisshin (JP); Yu Morimoto, Nagoya (JP); Manabu Kato, Susono (JP); Kazutaka Kimura, Susono (JP); Hiroo Yoshikawa, Susono (JP); Toshiyuki Suzuki, Toyota (JP); Tsutomu Ochi, Aichi-ken (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 881 days.

(21) Appl. No.: 12/161,180

(22) PCT Filed: Jan. 19, 2007

(86) PCT No.: PCT/IB2007/000132
§ 371 (c)(1),
(2), (4) Date: Jul. 17, 2008

(87) PCT Pub. No.: WO2007/083229
PCT Pub. Date: Jul. 26, 2007

(65) Prior Publication Data
US 2010/0239945 A1 Sep. 23, 2010

(30) Foreign Application Priority Data
Jan. 20, 2006 (JP) ................. 2006-012627

(51) Int. Cl.
*H01M 8/10* (2006.01)
(52) U.S. Cl. ........................ 429/483; 429/491
(58) Field of Classification Search .................. 429/483, 429/491
See application file for complete search history.

(56) References Cited

U.S. PATENT DOCUMENTS

| 7,608,350 | B2 * | 10/2009 | Murphy et al. ............... 429/494 |
| 2005/0000799 | A1 | 1/2005 | Murphy et al. |
| 2006/0280985 | A1 | 12/2006 | Toyoda et al. |

FOREIGN PATENT DOCUMENTS

EP 1 345 280 A1 9/2003
(Continued)

OTHER PUBLICATIONS

Office Action issued on Aug. 28, 2009, for Chinese Application No. CN 200780002649.5.
(Continued)

*Primary Examiner* — Jane Rhee
(74) *Attorney, Agent, or Firm* — Finnegan, Henderson, Farabow, Garrett & Dunner, LLP

(57) ABSTRACT

A membrane electrode assembly according to the invention includes a solid polymer electrolyte membrane and an electrode joined to each of two sides of the solid polymer electrolyte membrane. The solid polymer electrolyte membrane is such that some or all of the protons included in the entire solid polymer electrolyte membrane, a band region, or a non-power generating region are ion exchanged with one or more cations selected from among complex cations, class four alkylammonium cations, and high valence cations. In addition or alternatively, the solid polymer electrolyte membrane includes an organo-metalloxane polymer obtained by impregnating the entire solid polymer electrolyte membrane, the non-power generating region, or the band region with an organo-metalloxane monomer that includes an ammonium cation or a class four ammonium cation at its terminus and then hydrolyzing and polycondensing the organo-metalloxane monomer.

6 Claims, 5 Drawing Sheets

FOREIGN PATENT DOCUMENTS

| | | |
|---|---|---|
| JP | 9-199145 | 7/1997 |
| JP | 2000-215903 | 8/2000 |
| JP | 2000-251905 | 9/2000 |
| JP | 2001-6701 | 1/2001 |
| JP | 2001-11219 | 1/2001 |
| JP | 2001-325963 | 11/2001 |
| JP | 2003-59511 | 2/2003 |
| JP | 2004-18573 | 1/2004 |
| JP | 2004-220951 | 8/2004 |
| JP | 2005-50816 | 2/2005 |
| JP | 2005-310454 | 11/2005 |
| WO | WO 01/79336 A1 | 10/2001 |
| WO | WO 2004/095615 A2 | 11/2004 |
| WO | WO 2005/114772 A2 | 12/2005 |
| WO | WO 2005/124911 A1 | 12/2005 |
| WO | WO 2005/124912 | 12/2005 |

OTHER PUBLICATIONS

Notification of Reasons(s) for Refusal dated Feb. 16, 2010 for JP 2006-012627.

* cited by examiner

F I G. 3

| | TREATMENT METHOD | ION EXCHANGE RATE (%) | TEST REAGENT USED | INITIAL COEFFICIENT OF ELASTICITY (MPa) | MOISTURE CONTENT (wt%) | F- DISSOLUTION RATE (μg/cm² × h) |
|---|---|---|---|---|---|---|
| EXAMPLE 1 | A | 100 | [Co(NH$_3$)$_6$]Cl$_3$ | 100 | 3.13 | 0.12 |
| EXAMPLE 2 | A | 100 | Co(NO$_3$)$_2$ | 33 | 20.3 | 2.18 |
| EXAMPLE 3 | A | 100 | Ce$_2$(SO$_4$)$_3$ | 49 | 16.8 | 0.17 |
| EXAMPLE 4 | A | 100 | Ce(SO$_4$)$_2$ | 55 | 14.0 | 0.09 |
| EXAMPLE 5 | A | 100 | [(CH$_3$CH$_2$CH$_2$)$_4$N]OH | 10 | 1.25 | 1.22 |
| EXAMPLE 6 | A | 100 | NaOH | 38 | 22.0 | 11.67 |
| EXAMPLE 7 | A | 100 | Mg(NO$_3$)$_2$ | 37 | 19.9 | 10.99 |
| EXAMPLE 8 | A | 100 | Al(NO$_3$)$_3$ | 40 | 17.7 | 0.98 |
| EXAMPLE 9 | B | 100 | (TMSiTMA)Cl | 120 | 2.57 | 3.26 |
| COMPARATIVE EXAMPLE 1 | C | — | TEOS | 19 | 23.3 | 11.1 |
| COMPARATIVE EXAMPLE 2 | — | — | H$_2$O | 23 | 16.1 | 11.7 |

FIG. 4

|  | ION EXCHANGE RATE (%) | TEST REAGENT USED | INITIAL COEFFICIENT OF ELASTICITY (MPa) |
|---|---|---|---|
| EXAMPLE 10 | 100 | $[Pt(NH_3)_4]Cl_2$ | 185 |
| EXAMPLE 11 | 100 | $[Ru(NH_3)_6]Cl_3$ | 101 |

FIG. 5

| | STRENGTHENED REGION | ION EXCHANGE RATE (%) | TEST REAGENT USED | ENDURANCE TIME (hr) |
|---|---|---|---|---|
| EXAMPLE 12 | ENTIRE MEMBRANE | 10 | $[Co(NH_3)_6]Cl_3$ | 450 |
| EXAMPLE 13 | ENTIRE MEMBRANE | 10 | $Ce(SO_4)_2$ | 400 |
| EXAMPLE 14 | ENTIRE MEMBRANE | 10 | $[(CH_3CH_2CH_2)_4N]OH$ | 370 |
| EXAMPLE 15 | ENTIRE MEMBRANE | 10 | (TMSiTMA)Cl | 400 |
| EXAMPLE 16 | NON-POWER GENERATING REGION | 100 | $[Co(NH_3)_6]Cl_3$ | 500 |
| EXAMPLE 17 | BAND REGION | 100 | $[Co(NH_3)_6]Cl_3$ | 510 |
| COMPARATIVE EXAMPLE 3 | ENTIRE MEMBRANE | - | $H_2O$ | 250 |
| REFERENCE EXAMPLE 1 | ENTIRE MEMBRANE | 10 | $Mg(NO_3)_2$ | 260 |
| REFERENCE EXAMPLE 2 | ENTIRE MEMBRANE | 10 | $Ce(SO_4)_3$ | 350 |

MEMBRANE ELECTRODE ASSEMBLY AND POLYMER ELECTROLYTE MEMBRANE FUEL CELL

BACKGROUND OF THE INVENTION

1. Field of the Invention

The invention relates to a membrane electrode assembly and a polymer electrolyte membrane fuel cell. More specifically, the invention relates to a polymer electrolyte membrane fuel cell preferable for use as an on board power source, a stationary small generator, or a cogeneration system or the like, and a membrane electrode assembly for use in such a polymer electrolyte membrane fuel cell.

2. Description of the Related Art

A polymer electrolyte membrane fuel cell is based on units of membrane electrode assemblies (MEA) in which electrodes are joined to both sides of a solid polymer electrolyte membrane. Also, in the polymer electrolyte membrane fuel cell, electrodes typically have a bilayer structure of a diffusion layer and a catalyst layer. The diffusion layer is for supplying reaction gas and electrodes to the catalyst layer and is made of carbon paper or carbon cloth or the like. Also, the catalyst layer is the portion that serves as a reaction field for the electrode reaction, and typically formed of a composite body of carbon which carries an electrode catalyst such as platinum, and a solid polymer electrolyte membrane (an electrolyte in the catalyst layer).

An all perfluorocarbon electrolyte (i.e., an electrolyte which does not include a C—H bond in the polymer chain) having high oxidation resistance is typically used for the electrolyte in the catalyst layer or the electrolyte membrane that forms this kind of MEA. Examples of such an electrolyte include Nafion (registered trademark; manufactured by DuPont), Aciplex (registered trademark; manufactured by Asahi Kasei (Corp.)), Flemion (registered trademark; manufactured by Asahi Glass Co., Ltd), etc. Also, an all perfluorocarbon electrolyte is highly resistant to oxidation but is also generally extremely expensive. Therefore, in order to reduce the cost of the polymer electrolyte membrane fuel cell, the use of a hydrocarbon electrolyte (i.e., an electrolyte which include a C—H bond but not a C—F bond in the polymer chain) and a partial perfluorocarbon electrolyte (i.e., an electrolyte including both a C—H bond and a C—F bond in the polymer chain) is also being considered.

However, in order to put a polymer electrolyte membrane fuel cell into practical use as an on board power source, for example, some problems still have to be solved. For example, while a hydrocarbon electrolyte is less expensive than an all perfluorocarbon electrolyte, it also tends to be degraded by peroxide radicals. Also, a gasket is usually secured around the outer peripheral portion of a solid polymer electrolyte membrane to ensure a gas seal. However, constriction by this gasket applies shear stress to the solid polymer electrolyte membrane which leads to failure of the membrane and reduces the gas seal function. Furthermore, the solid polymer electrolyte membrane repeatedly expands and contracts due to changes in temperature and humidity that occur during use. Therefore, stress is apt to occur particularly at the outer peripheral portion of the electrode.

There have been various proposals to solve the problem described above. For example, Japanese Patent Application Publication No. JP-A-2004-018573 (reference 1) describes a proton-conducting polymer membrane obtained by immersing a sulfonated polyphenylene sulfide film in a solution in which magnesium acetate tetrahydrate, calcium acetate, aluminum triisopropoxide, or lanthanum nitrate hydrate has been dissolved. This reference cites that i) some of the hydrogen atoms of a proton-conducting substituent that includes a sulfonated polyphenylene sulfide film is substituted with metal ions such as $Mg^{2+}$ by applying this kind of treatment, and ii) oxidation resistance of the sulfonated polyphenylene sulfide film is improved by substituting some of the hydrogen atoms with metal ions.

Also, Japanese Patent Application Publication No. JP-A-2000-215903 (reference 2) describes a membrane electrode assembly in which fibers of a center portion of plain-woven fabric woven with polytetrafluoroethylene fibers are cut in chained lines and an open portion is formed in the center portion by pulling out the cut fibers. A composite membrane is then made by impregnating the entire plain-woven fabric with Nafion solution, and an electrode having a larger area than the open portion is joined to both sides of this composite membrane. This reference cites that it is possible to inhibit the membrane from breaking due to the constriction by the gasket, or inhibit degradation of the membrane due to the portion to the inside of the gasket and to the outside of the electrode expanding and contracting.

One issue with fuel cells is how to suppress degradation of the electrolyte membrane. Two root causes of degradation are the decomposition of polymer molecules due to chemical species such as radicals (i.e., a chemical cause) and damage of the membrane from stress (i.e., a mechanical cause).

According to reference 1, when substituting some of the hydrogen atoms of the proton-conducting substituent with a given species of metal ion, the chemical resistance of the electrolyte membrane increases. However, depending on the ion species that is being ion-exchanged, sufficient chemical resistance for practical use is unable to be obtained. Also, the method described in reference 1 performs ion exchange with the entire membrane so some of the protons must be left in order to maintain power generating performance. As a result, the effect is reduced by half compared with a case in which ion exchange is performed with all of the protons. Further, among the ion species specifically described in reference 1 are some which are effective for improving chemical resistance, however, they are not very effective for improving mechanical strength.

On the other hand, the method described in reference 2 is effective for suppressing degradation of the membrane caused by constriction from the gasket and expansion and contraction of the membrane. However, this method does not enable degradation of the membrane due to a chemical cause to be suppressed. Also, the outer peripheral portion of the membrane is combined with polytetrafluoroethylene or the like so there is a possibility that the membrane and the reinforcing member may separate during use.

Moreover, degradation of the membrane due to a chemical cause starts at a specific portion of the membrane. Also, in order to suppress degradation of the membrane due to both the chemical and mechanical causes, the moisture content of the membrane must also be controlled. However, there is no related art that proposes a method to strengthen an electrolyte membrane that takes these points into account.

SUMMARY OF THE INVENTION

This invention thus provides a membrane electrode assembly able to simultaneously suppress both degradation of a membrane due to a chemical cause and degradation of the membrane due to a mechanical cause, as well as a polymer electrolyte membrane fuel cell using this membrane electrode assembly. Also, this invention suppresses degradation of the membrane due to a chemical cause that starts at a specific portion of the membrane. Further, this invention controls the moisture content of the membrane, and as a result, suppresses degradation of the membrane due to both chemical and mechanical causes.

A first aspect of the invention relates to a membrane electrode assembly that includes a solid polymer electrolyte membrane, and an electrode joined to each of two sides of the solid polymer electrolyte membrane. The solid polymer electrolyte membrane is such that some protons are ion exchanged with one or more cations selected from a group consisting of a complex cation, a class four alkylammonium cation, and high valence cation which is a metal ion that can take on a plurality of valences and which has a valence larger than the lowest valence. In addition or alternatively, the solid polymer electrolyte membrane includes an organo-metalloxane polymer obtained by impregnating the solid polymer electrolyte membrane with a solution that includes an organo-metalloxane monomer having one cation from among an ammonium cation and a class four ammonium cation at a terminus thereof, and hydrolyzing and polycondensing the organo-metalloxane monomer.

A second aspect of the invention relates to a membrane electrode assembly that includes a solid polymer electrolyte membrane, and an electrode joined to each of two sides of the solid polymer electrolyte membrane and which includes a catalyst layer. All or some protons included in a non-power generating region, which is an outer peripheral portion of the solid polymer electrolyte membrane and in which the catalyst layer is not formed on at least one side, are ion exchanged with one or two or more types of cations. In addition or alternatively, the solid polymer electrolyte membrane includes an organo-metalloxane polymer obtained by impregnating the non-power generating region with a solution that includes an organo-metalloxane monomer having one cation from among an ammonium cation and a class four ammonium cation at a terminus thereof, and hydrolyzing and polycondensing the organo-metalloxane monomer.

A third aspect of the invention relates to a membrane electrode assembly that includes a solid polymer electrolyte membrane, and an electrode joined to each of two sides of the solid polymer electrolyte membrane and which includes a catalyst layer. All or some protons included in a band region, which is a middle portion of the solid polymer electrolyte membrane and includes therein an outer periphery of the catalyst layer, are ion exchanged with one or two or more types of cations. In addition or alternatively, the solid polymer electrolyte membrane includes an organo-metalloxane polymer obtained by impregnating the band region with an organo-metalloxane monomer having one cation from among an ammonium cation and a class four ammonium cation at a terminus thereof, and hydrolyzing and polycondensing the organo-metalloxane monomer.

When all or some of the protons of the solid polymer electrolyte membrane are ion exchanged with cations (particularly complex cations, class four alkylammonium cations, and/or high valence cations), degradation of the membrane due to both chemical and mechanical causes can be suppressed. Also, when the membrane and the organo-metalloxane polymer are combined, degradation of the membrane due to both chemical and mechanical causes can be suppressed.

Further, degradation of the membrane due to chemical causes is particularly marked in the single-sided catalyst region. Therefore, performing ion exchange in advance on the band region or non-power generating region that includes a single-sided catalyst region using cations or strengthening the band region or non-power generating region that includes a single-sided catalyst region with an organo-metalloxane polymer enables degradation of the membrane due to both chemical and mechanical causes to be suppressed. Also, optimizing the moisture content in the membrane enables degradation of the membrane due to chemical causes to be suppressed.

BRIEF DESCRIPTION OF THE DRAWINGS

The foregoing and/or further objects, features and advantages of the invention will become more apparent from the following description of preferred embodiments with reference to the accompanying drawings, in which like numerals are used to represent like elements and wherein:

FIG. 3 is a chart showing the treatment methods of an electrolyte membrane in Examples 1 to 9 of the invention and Comparative examples 1 and 2, as well as the test results of the electrolyte membrane obtained from each treatment;

FIG. 4 is a chart showing the treatment methods of an electrolyte membrane in Examples 10 and 11 of the invention, as well as the test results of the electrolyte membrane obtained from each treatment; and FIG. 5 is a chart showing the treatment methods of an electrolyte membrane in Examples 12 to 17 of the invention, Comparative example 3, and Reference examples 1 and 2, as well as the test results of the electrolyte membrane obtained from each treatment.

DETAILED DESCRIPTION OF THE PREFERRED EMBODIMENTS

Figure 1A:
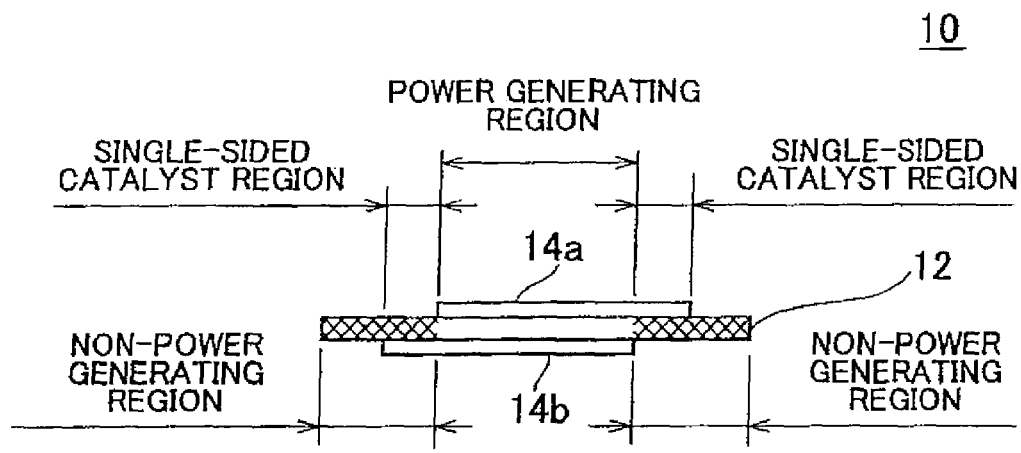
FIG. 1A is a front view of an MEA according to a second example embodiment of the invention.

In the following description and the accompanying drawings, the present invention will be described in more detail in terms of exemplary embodiments.

A membrane electrolyte assembly (MEA) according to a first example embodiment of the invention includes a solid polymer electrolyte membrane and electrodes joined to both sides of the solid polymer electrolyte membrane.

In the invention, various materials may be used for the solid polymer electrolyte membrane. That is, the solid polymer electrolyte membrane may be made of either a hydrocarbon electrolyte or a perfluorocarbon electrolyte. Also, the perfluorocarbon electrolyte may be either a partial perfluorocarbon electrolyte or an all perfluorocarbon electrolyte. Here, the term "hydrocarbon electrolyte" refers to an electrolyte that includes a C—H bond but does not include a C—F bond in the polymer framework. The term "perfluorocarbon electrolyte" refers to an electrolyte that includes a C—F bond in the polymer framework. The term "partial perfluorocarbon electrolyte" refers to an electrolyte that includes both a C—H bond and a C—F bond in the polymer framework. The term "all perfluorocarbon electrolyte" refers to an electrolyte that includes a C—F bond but does not include a C—H bond in the polymer framework. In this invention, when the term "all perfluorocarbon electrolyte" is used, it also includes an electrolyte having a C—Cl bond (such as —CFCl—, —CCl$_2$— or the like) and other structures (such as —O—, —S—, —C(=O)—, —N(R)— and the like, where "R" is an alkyl group), in addition to a C—F bond, in the polymer framework. The type of positive ion exchange group included in the solid polymer electrolyte membrane is lot particularly limited. Specific examples of the positive ion exchange group include a sulphonate group, a carboxylic acid group, a phosphonate group, a phosphonite group, and a phenolic group. The foregoing polymers may have one or two or more or these positive ion exchange groups.

Specific examples of a solid polymer electrolyte in which all or a portion of the polymer framework is fluorinated include a perfluorocarbon sulphonate polymer, a perfluorocarbon phosphonate polymer, a trifluoro styrene sulphonate polymer, and an ethylene tetra fluoro ethylene-g-styrene sulphonate polymer. Also, specific examples of a hydrocarbon solid polymer electrolyte that does not contain fluorine include polysulphonic acid, poly aryl ether ketone sulphonic acid, poly benzimidazole alkyl sulphonic acid, and poly benzimidazole alkyl phosphonic acid.

Among these, the all perfluorocarbon electrolyte has high chemical resistance which makes it is particularly desirable as a solid polymer electrolyte membrane constituting an MEA.

The electrode may be formed only of the catalyst layer or may have a bilayer structure with a catalyst layer and a diffusion layer.

The diffusion layer is a layer for supplying reaction gas to the catalyst layer and sending and receiving electrons. The material of the diffusion layer is not particularly limited as long as it is porous and conducts electrons. Porous carbon cloth or carbon paper or the like is typically used for the diffusion layer.

The catalyst layer is a layer that serves as a reaction field for the electrode reaction and includes a catalyst and an electrolyte in the catalyst layer which has a positive ion exchange group. The catalyst may be included in the catalyst layer independently or be included in the catalyst layer in a state in which it is carried on a catalyst carrier. Also, the material of the catalyst or catalyst carrier is not particularly limited and may be any one of various materials depending on the use. Normally, Pt or a Pt alloy is used as the catalyst and is carried on the surface of a catalyst carrier such as carbon black. The electrolyte in the catalyst layer is applied to give ion conductivity to the catalyst layer and form a three phase boundary in the catalyst layer. The material of the electrolyte in the catalyst layer is not particularly limited and may be any one of various materials depending on the use. Normally, an electrolyte having the same component as the solid polymer electrolyte membrane is used but an electrolyte of a different component may also be used.

In this example embodiment, the entire solid polymer electrolyte membrane is strengthened according to a specific method. Here, the phrase "the entire membrane is strengthened" refers to the fact that the surface layer and/or the inside portion of the membrane is strengthened across the entire surface of the membrane. In order to improve the durability of the MEA, at least the surface layer of the membrane is preferably strengthened across the entire surface of the membrane. Also, in order to greatly improve the durability of the MEA, the surface layer and the inside portion of the membrane are preferably strengthened across the entire surface of the membrane. When strengthening the surface layer and the inside portion of the membrane, the degree to which both are strengthened may be the same or different.

Specific examples of a method to strengthen the entire membrane are as follows.

A first method ion-exchanges some of the protons included in the solid polymer electrolyte membrane with cations. The type of cations that are exchanged for the protons are not particularly limited but cations having a relatively strong effect of improving mechanical characteristics and/or chemical resistance of the MEA can be used. Specific examples include (1) complex cations, (2) class four alkylammonium cations, (3) high valence cations, and (4) other cations.

"Complex cations" refer to compounds in which a ligand has bonded around a metal atom, and have a positive valency for the overall compound. In this invention, the type of complex cation is not particularly limited; a variety of complex cations can be used. Specifically examples of the complex cation include (1) amine complex cations such as hexa ammine cobalt (III) cations ($[Co(NH_3)_6]^{3+}$), tetra ammine platinum (II) cations ($[Pt(NH_3)_4]^{2+}$), hexa ammine ruthenium (III) cations ($[Ru(NH_3)_6]^{3+}$), and hexa ammine platinum (IV) cations ($[Pt(NH_3)_6]^{4+}$), and (2) a complex cation that includes several types of ligands such as penta ammine nitrosyl cobalt (II) cations ($[Co(NH_3)_5(NO)]^{2+}$), penta ammine chloro cobalt (III) cations ($[Co(NH_3)_5Cl]^{3+}$), and tetra ammine chloro nitrosyl ruthenium (III) cations ($[RuCl(NH_3)_4(NO)]^{2+}$). Among these, the ammine complex cation significantly improves the chemical resistance and mechanical characteristics of the membrane, which makes it particularly preferable as the complex cation to be exchanged with the protons.

"Class four alkylammonium cations" refer to cations the general expression for which is written as $R_4N^+$ (where R is an alkyl group). The four alkyl groups R that are bonded to the N atom may be the same or different. Specific examples of class four alkylammonium cations include tetrapropylammonium cations ($[(CH_3CH_2CH_2)_4N]^+$), tetrabutylammonium cations ($[(CH_3CH_2CH_2CH_2)_4N]^+$), and trimethyl benzylammonium cations ($[(CH_3)_3C_6H_5N]^+$).

"High valence cations" refer to cations which are metal ions that can take on a plurality of valences and which have a valence larger than the lowest valence. For example, cerium takes two oxidization states, i.e., a trivalent oxidization state and a quadrivalent oxidization state. In this case, the high valence cation is $Ce^{4+}$. Specific examples of other high valence cations include $Pr^{4+}$, $Sm^{3+}$, $Eu^{3+}$, $Tb^{4+}$, and $Yb^{3+}$.

Examples of other cations which have a relatively strong effect of improving the mechanical characteristics (particularly the initial elasticity) of the membrane include cesium ions ($Cs^+$), calcium ions ($Ca^{2+}$), strontium ions ($Sr^{2+}$), barium ions ($Ba^{2+}$), zirconyl ions ($ZrO^{2+}$), chrome (III) ions ($Cr^{3+}$), and cerium (III) ions ($Ce^{3+}$). Also, examples of other cations which have a relatively strong effect of improving the chemical resistance of the membrane include zirconyl ions ($ZrO2+$), aluminum ions ($Al^{3+}$), chrome (III) ions ($Cr^{3+}$), and cerium (III) ions ($Ce^{3+}$).

Some of the protons in the solid polymer electrolyte membrane may be substituted with one or two or more types of the foregoing various cations. Also, the ion exchange rate with the various cations (=number of cations×the cation valences×100/the number of positive ion groups (%)) is preferably at least 0.01%. When the ion exchange rate is less than 0.01%, chemical resistance and mechanical characteristics sufficient for practical use are unable to be obtained. More preferably, the ion exchange rate is at least 0.1%, and even more preferably, at least 1%. On the other hand, if the ion exchange rate is too high, the electrical conductivity of the solid polymer electrolyte membrane decreases and the power generating performance is unable to be maintained. Therefore, the ion exchange rate is preferably no more than 95%, more preferably, no more than 50%, and even more preferably, no more than 30%.

A second method for strengthening the membrane is a method which introduces an organo-metalloxane polymer into the solid polymer electrolyte membrane. Here, this "organo-metalloxane polymer" refers to a polymer obtained by hydrolyzing and polycondensing an organo-metalloxane monomer (and another metalloxane monomer when necessary). Also, an "organo-metalloxane monomer" refers to a compound having an ammonium cation or a class four ammonium cation at the terminus and can be expressed by Expression (1) below.

$$[(RO)_3M-(CH_2)_n-(R')(R'')(R''')N]X \qquad (1)$$

The term M is a quadrivalent metallic element (such as Ge, Si, Ti, or Zr). The term n is an integer equal to or greater than zero. The term RO is an alkoxy group. The terms R', R", and R'" are hydrogen or alkoxy groups, and the term X is a halogen element such as Cl or Br.

The three alkoxy groups RO that are bonded to the M may be all the same or different. Similarly, the R', R", and R'" that are bonded to the N may be all the same or different.

A specific example of the organo-metalloxane monomer includes an organo alkoxy silane such as N-trimethoxysilylpropyl-N,N,N-trimethylammonium chloride ((TMSiTMA) Cl; [(CH$_3$O)$_3$SiCH$_2$CH$_2$CH$_2$(CH$_3$)$_3$N]Cl), N-trimethoxysilylpropyl-N,N,N-butylammonium bromide ([(CH$_3$O)$_3$Si (CH$_2$)$_3$(C$_4$H$_9$)$_3$N]Br), and N-trimethoxysilylpropyl-N,N,N-butylammonium chloride ([(CH$_3$O)$_3$Si(CH$_2$)$_3$(C$_4$H$_9$)$_3$N]Cr).

The organo-metalloxane polymer may be obtained by hydrolyzing and polycondensing any one or two or more types from among these organo-metalloxane monomers. Also, the organo-metalloxane polymer may be obtained by hydrolyzing and polycondensing one or two or more types of organo-metalloxane monomers and one or two or more types of metalloxane monomers. Here the term "metalloxane monomer" refers to a compound that can form a polymer having a metalloxane bond ($M_1$-O-$M_2$; $M_1$, $M_2$ are metallic elements) by being hydrolyzed and polycondensed.

Specific examples of metalloxane monomers include (1) a silicon analogue such as tetraethoxysilane (TEOS; Si(OC$_2$H$_5$)$_4$), methyltriethoxysilane (CH$_3$Si(OC$_2$H$_5$)$_3$), dimethyldiethoxysilane ((CH$_3$)$_2$Si(OC$_2$H$_5$)$_2$), phenyltriethoxysilane (C$_6$H$_5$Si(OC$_2$H$_5$)$_3$), diethoxydiphenylsilane ((C$_6$H$_5$)$_2$Si (OC$_2$H$_5$)$_2$), (2) a germanium alkoxide such as tetraethoxygermanium (Ge(OC$_2$H$_5$)$_4$) and tetramethoxygermanium (Ge(OCH$_3$)$_4$), and (3) a titanium alkoxide such as titanium ethoxide (Ti(OC$_2$H$_5$)$_4$) and titanium dichloride diethoxide (TiCl$_2$(OC$_2$H$_5$)$_2$).

In particular, the silicon analogue having a hydrophobic group such as a methyl group or a phenyl group has an effect of reducing the moisture content in the electrolyte membrane and improving the chemical resistance of the MEA, which makes it particularly preferable as a monomer used in combination with an organo-metalloxane monomer. Furthermore, the solid polymer electrolyte membrane may contain one or two or more types of these organo-metalloxane polymers.

As described above, the organo-metalloxane polymer is formed by impregnating the solid polymer electrolyte membrane with a solution that includes an organo-metalloxane monomer (and a metalloxane monomer when necessary), and hydrolyzing and polycondensing the organo-metalloxane monomer at the inside portion of the membrane. In this case, the organo-metalloxane monomer is introduced so that the ion exchange rate with the cations which are at the terminus is within the range described above. That is, in order to obtain chemical resistance and mechanical characteristics sufficient for practical use, the amount of organo-metalloxane polymers that are introduced is converted into an ion exchange rate with the organo-metalloxane monomers and that ion exchange rate is preferably at least 0.01%, more preferably at least 0.1%, and even more preferably at least 1%. Also, in order to maintain power generating performance sufficient for practical use, the amount of organo-metalloxane polymers that are introduced is converted into an ion exchange rate and that ion exchange rate is preferably no more than 95%, more preferably no more than 50%, and even more preferably no more than 30%. When introducing a metalloxane monomer in addition to the organo-metalloxane monomer, the amount of metalloxane monomers that are introduced is not particularly limited and may be selected appropriately depending on the purpose. This is because it is unlikely that the power generating performance will decrease even if an excess of metalloxane monomers is introduced because the metalloxane monomers do not include cations.

The first method (i.e., the method of strengthening by ion exchange) and the second method (i.e., the method of strengthening by introducing an organo-metalloxane polymer) may be used independently or in combination with each other. Also, when the first and second methods are used in combination with each other, the various cations and the organo-metalloxane monomers may be introduced into the membrane such that the sum of the ion exchange rates with the various cations and the organo-metalloxane monomers is within the range described above.

Next, the MEA according to a second example embodiment of the invention will be described. The MEA according to this example embodiment includes a solid polymer electrolyte membrane and an electrode that includes a catalyst layer joined to both sides of the solid polymer electrolyte membrane. Also, in this example embodiment, the solid polymer electrolyte membrane is such that at least a non-power generating region is strengthened according to a specific method.

Here, the phrase "the non-power generating region is strengthened" refers to the fact that the surface layer and/or the inside portion of the membrane is strengthened across the entire surface of the non-power generating region. To improve the durability of the MEA, the surface layer of the membrane at the very least may be strengthened across the entire surface of the non-power generating region. Also, to drastically improve the durability of the MEA, the surface layer and the inside portion of the membrane may be strengthened across the non-power generating region. When strengthening the surface layer and the inside portion of the membrane, the degree to which both are strengthened may be the same or different. Also, the term "non-power generating region" refers to the region which is the outer peripheral portion of the solid polymer electrolyte membrane, in which a catalyst layer is not formed on at least one side.

Figure 1B:
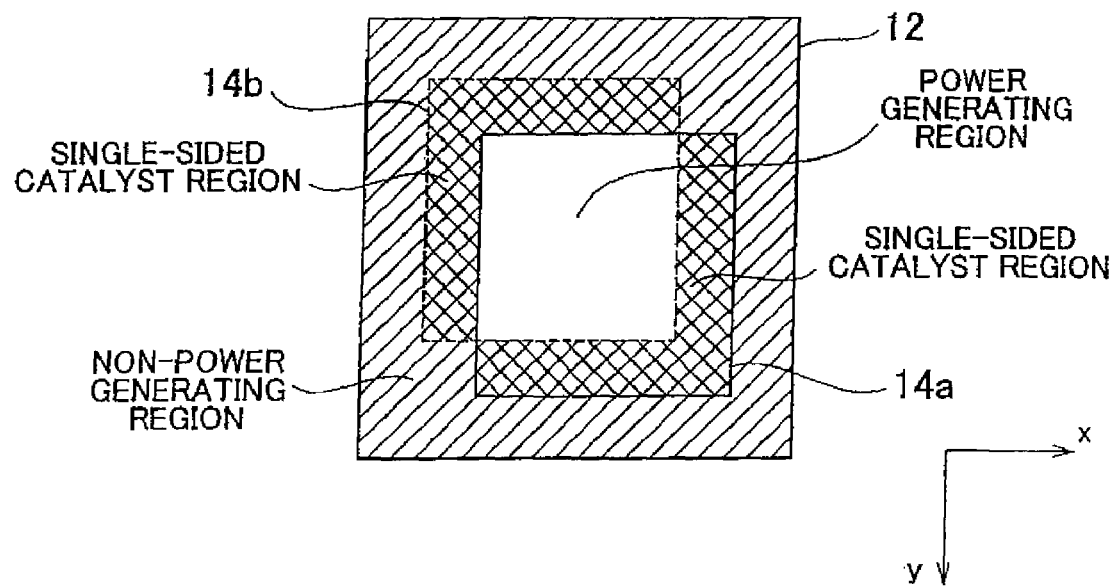
FIG. 1B is a plan view of that MEA.

FIGS. 1A and 1B are block diagrams schematically showing the MEA according to this example embodiment. The MBA 10 includes a solid polymer electrolyte membrane 12 and catalyst layers 14a and 14b one of which is joined to each side of the solid polymer electrolyte membrane 12. The catalyst layers 14a and 14b normally are the same size. Also, the catalyst layers 14a and 14b are normally joined to substantially the center portion of the solid polymer electrolyte membrane 12 in a manner symmetrical with respect to the solid polymer electrolyte membrane 12.

However, if there is variation in the size of the catalyst layers 14a and 14b due to error in the manufacturing process or if the positions in which the catalyst layers 14a and 14b are joined to the solid polymer electrolyte membrane 12 are off with respect to one another, it results in the formation of two types of regions, i.e., a region in which the catalyst layers 14a and 14b are formed on both sides of the solid polymer electrolyte membrane 12 (i.e., a power generating region), and a region in which the catalyst layers 14a and 14b are formed on only one side of the solid polymer electrolyte membrane 12 (i.e., a single-sided catalyst region). The term "non-power generating region" refers to a region that includes both this kind of single-sided catalyst region as well as the region where neither the catalyst layer 14*a* nor the catalyst layer 14*b* is formed.

Specific examples of methods for strengthening the non-power generating region are as follows.

The first method ion exchanges some or all of the protons included in the non-power generating region with cations. The type of cations to be exchanged for the protons are not particularly limited but cations having a relatively strong effect of improving mechanical characteristics and/or chemical resistance of the MEA can be used. Specific examples include (1) complex cations, (2) class four alkylammonium cations, (3) high valence cations, and (4) other cations. In particular, when the type of cations to be exchanged with the protons is at least one from among complex cations, class four alkylammonium cations, and high valence cations, the mechanical characteristics and chemical resistance of the MEA improve remarkably.

Generally, a higher the ion exchange rate with these cations yields better mechanical characteristics and chemical resistance but it also reduces the electrical conductivity of the solid polymer electrolyte membrane. However, because the non-power generating region is a region that does not contribute to power generation, the higher the ion exchange rate the better. In fact, all of the protons may be ion exchanged with a predetermined cation. More specifically, the ion exchange rate with the various cations is preferably at least 1%, more preferably at least 50%, and even more preferably at least 90%.

A second method for strengthening the non-power generating region is a method which introduces an organo-metalloxane polymer obtained by impregnating the non-power generating region with an organo-metalloxane monomer (and another metalloxane monomer when necessary) and hydrolyzing and polycondensing that organo-metalloxane monomer.

The organo-metalloxane polymer may be obtained by hydrolyzing and polycondensing one or two or more types of organo-metalloxane monomers from among the organo-metalloxane monomers described above. The organo-metalloxane polymer may also be obtained by hydrolyzing and polycondensing one or two or more types of organo-metalloxane monomers and one or two or more types of metalloxane monomers. Furthermore, the non-power generating region may include one or two or more types of these organo-metalloxane polymers.

The non-power generating region is a region that does not contribute to power generation so in order to improve the durability of the MEA, the more organo-metalloxane polymers the better. The amount of organo-metalloxane polymers that are introduced to the non-power generating region is converted into an ion exchange rate with the organo-metalloxane monomers, and that ion exchange rate is preferably at least 1%, more preferably at least 50%, and even more preferably at least 90%.

The first method (i.e., the method of strengthening by ion exchange) and the second method (i.e., the method of strengthening by introducing an organo-metalloxane polymer) may be used independently or in combination with each other. Also, when the first and second methods are used in combination with each other, the various cations and the organo-metalloxane monomers are preferably introduced into the non-power generating region such that the sum of the ion exchange rates with the various cations and the organo-metalloxane monomers is within the range described above.

In this example embodiment, only the non-power generating region may be strengthened by the first method and/or the second method described above. Alternatively, all or part of the power generating region which is adjacent to the non-power generating region may also be strengthened in addition to the non-power generating region. Particularly, strengthening a region adjacent to the non-power generating region enables degradation to be reliably suppressed even if a single-sided catalyst region is formed due to error in the manufacturing process.

However, when strengthening within the power generating region, a higher ion exchange rate and/or a larger area of the region to be strengthened in the power generating region does increase the mechanical characteristics and chemical resistance but it also tends to reduce the power generating performance. Therefore, when strengthening the entire power generating region, the ion exchange rate within the power generating region is preferably less than it is in the non-power generating region. Also, when strengthening a portion within the power generating region that is adjacent to the non-power generating region with an ion exchange rate that is substantially the same as that of the non-power generating region, the area of the region to be strengthened is preferably no more than 50% of the area of the power generating region.

Other points related to the various cations, the organo-metalloxane polymer, the organo-metalloxane monomer, and the siloxane monomer, as well as other points related to the solid polymer electrolyte membrane and the electrode are the same as in the first example embodiment and so descriptions thereof will be omitted here.

Next, an MEA according to a third example embodiment of the invention will be described. The MEA according to this example embodiment includes a solid polymer electrolyte membrane and an electrode that includes a catalyst layer joined to both sides of the solid polymer electrolyte membrane. Also, in this example embodiment, the solid polymer electrolyte membrane is such that at least a band region is strengthened according to a specific method.

Here, the phrase "the band region is strengthened" refers to the fact that the surface layer and/or the inside portion of the membrane is strengthened across the entire surface of the band region. To improve the durability of the MBA, it is preferable to strengthen the surface layer of the membrane at the very least across the entire surface of the band region. Also, to greatly improve the durability of the MEA, it is preferable to strengthen the surface layer and the inside portion of the membrane across the entire surface of the band region. When strengthening the surface layer and the inside portion of the membrane, the degree to which both are strengthened may be the same or different. Also, the term "band region" refers to a region which is the middle portion of the solid polymer electrolyte membrane and includes the outer peripheral portion of the catalyst layer within it.

Figure 2A:
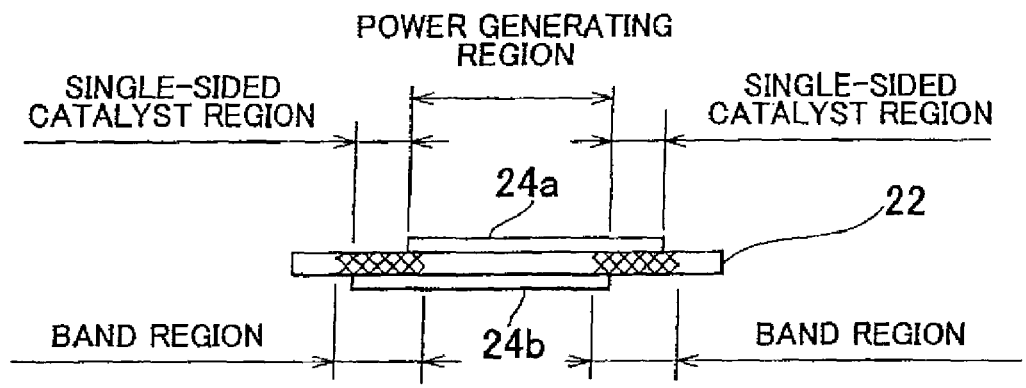
FIG. 2A is a front view of an MEA according to a third example embodiment of the invention.
Figure 2B:
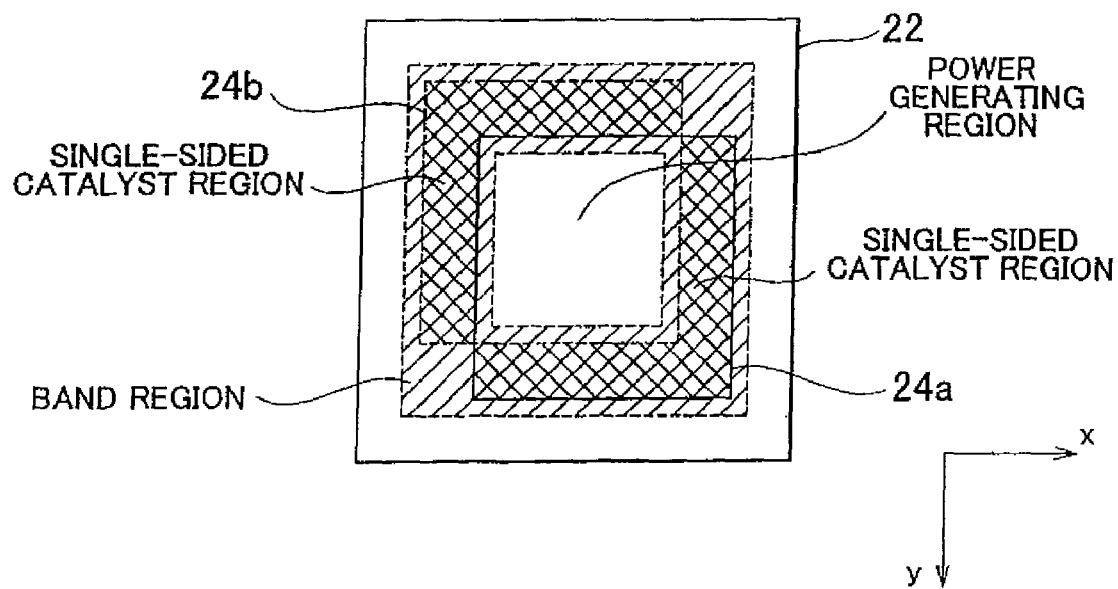
FIG. 2B is a plan view of that MEA.

FIGS. 2A and 2B are block diagrams schematically showing the MEA according to this example embodiment. The MEA 20 includes a solid polymer electrolyte membrane 22 and catalyst layers 24*a* and 24*b* one of which is joined to each side of the solid polymer electrolyte membrane 22. The catalyst layers 24*a* and 24*b* normally are the same size. Also, the catalyst layers 24*a* and 24*b* are normally joined to substantially the center portion of the solid polymer electrolyte membrane 22 in a manner symmetrical with respect to the solid polymer electrolyte membrane 22.

However, if there is variation in the size of the catalyst layers 24*a* and 24*b* due to error in the manufacturing process or if the positions in which the catalyst layers 24*a* and 24*b* are joined to the solid polymer electrolyte membrane 22 are off with respect to one another, a power generating region and single-sided catalyst region are formed on the solid polymer electrolyte membrane 22, as described above. The term "band region" refers to a frame-like region of a predetermined width that includes the outer peripheral portions of the pair of catalyst layers 24a and 24b. Also, when a single-sided catalyst region is formed due to error in the manufacturing process, the "band region" is a region which includes this single-sided catalyst region inside it.

The band region must have a width wide enough so that, should a single-sided catalyst region be formed due to error in the manufacturing process, that single-sided catalyst region is able to fit within it. Therefore, the width of the band region must at least be such that the width of the outer periphery of the band region is wider than the widths of the catalyst layers 24a and 24b and the width of the inner periphery of the band region is narrower than the widths of the catalyst layers 24a and 24b. The optimum width of the band region is determined by the error in the manufacturing process. Generally, a wider band region enables the single-sided catalyst region to reliably fit within it even if the dimensional accuracy of the catalyst layers 24a and 24b and/or the accuracy of the positions where the catalyst layers 24a and 24b are joined to the solid polymer electrolyte membrane 22 is low.

Meanwhile, the power generating performance of the MEA is substantially proportional to the area of the power generating region. Accordingly, if the width of the band region is wider than necessary, the power generating performance may decline depending on the ion exchange rate. Therefore, the band region is preferably such that the area of the region surrounded by the inner periphery of the band region is at least 0.5 times the area of the catalyst layer. In other words, the width of the inner periphery of the band region is preferably at least 0.7 times the width of the outer periphery of the catalyst layer. Also, in order to reliably suppress degradation of the membrane, the band region is preferably such that the area of the region surrounded by the inner periphery of the band region is no more than the area of the power generating region.

The width of the outer periphery of the band region is not particularly limited. If the joining positions of the catalyst layers 24a and 24b, which are the same dimensions are off with respect to each other, the width of the power generating region decreases. At the same time, a single-sided catalyst region having the same width as the decreased width of the power generating region is formed to the left and right of the power generating region. Therefore, the width of the outer periphery of the band region is preferably equal to or greater than the total width of at least the width of the power generating region and the widths of the left and right single-sided catalyst regions.

Specific examples of methods for strengthening the band region are as follows.

A first method ion exchanges some or all of the protons included in the band region with cations. The type of cations to be exchanged for the protons are not particularly limited but cations having a relatively strong effect of improving mechanical characteristics and/or chemical resistance of the MEA can be used. Specific examples include (1) complex cations, (2) class four alkylammonium cations, (3) high valence cations, and (4) other cations. In particular, when the type of cations to be exchanged with the protons is at least one from among complex cations, class four alkylammonium cations, and high valence cations, the mechanical characteristics and chemical resistance of the MEA improve remarkably.

Generally, a higher the ion exchange rate with these cations yields better mechanical characteristics and chemical resistance but it also reduces the electrical conductivity of the solid polymer electrolyte membrane. However, because the band region is a region that contributes almost not at all to power generation, the higher the ion exchange rate the better. In fact, all of the protons may be ion exchanged with a predetermined cation. More specifically, the ion exchange rate with the various cations is preferably at least 1%, more preferably at least 50%, and even more preferably at least 90%.

A second method for strengthening the band region introduces an organo-metalloxane polymer obtained by impregnating the band region with an organo-metalloxane monomer (and another metalloxane monomer when necessary) and hydrolyzing and polycondensing the organo-metalloxane monomer. The organo-metalloxane polymer may be obtained by hydrolyzing and polycondensing one or two or more types of organo-metalloxane monomers from among the organo-metalloxane monomers described above. The organo-metalloxane polymer may also be obtained by hydrolyzing and polycondensing one or two or more types of organo-metalloxane monomers and one or two or more types of metalloxane monomers. Furthermore, the band region may include one or two or more types of these organo-metalloxane polymers.

The band region is a region that contributes almost not at all to power generation so the more organo-metalloxane polymers that are introduced into the band region the better in order to improve the durability of the MEA. The amount of organo-metalloxane polymers that are introduced to the band region is converted into an ion exchange rate with the organo-metalloxane monomers, and that ion exchange rate is preferably at least 1%, more preferably at least 50%, and even more preferably at least 90%.

The first method (i.e., the method of strengthening by ion exchange) and the second method (i.e., the method of strengthening by introducing an organo-metalloxane polymer) may be used independently or in combination with each other. Also, when the first and second methods are used in combination with each other, the various cations and the organo-metalloxane monomers are preferably introduced into the non-power generating region such that the sum of the ion exchange rates with the various cations and the organo-metalloxane monomers is within the range described above.

In this example embodiment, only the band region may be strengthened by the first method and/or the second method described above. Alternatively, the power generating region outside the band region may also be strengthened in addition to the band region. However, when strengthening within the power generating region, a higher ion exchange rate increases the mechanical characteristics and chemical resistance but also tends to reduce the power generating performance.

Therefore, when strengthening the power generating region outside the band region, the ion exchange rate thereof is preferably lower than it is in the band region.

Other points related to the various cations, the organo-metalloxane polymer, the organo-metalloxane monomer, and the siloxane monomer, as well as other points related to the solid polymer electrolyte membrane and the electrode are the same as in the first example embodiment and so descriptions thereof will be omitted here.

Next, a manufacturing method of an MEA according to the invention will be described. The a solid polymer electrolyte membrane in which all or some of the protons have been ion exchanged with a predetermined cation can be produced according to the following methods.

A first method immerses the solid polymer electrolyte membrane in a solution containing a predetermined amount of a predetermined cation ($M^{n+}$) for a predetermined period of time. When the electrolyte membrane is immersed in the solution, cations ($M^{n+}$) tend to enter the membrane until the concentration ratio of cations ($M^{n+}$) which are not protons to protons ($H^+$) in the electrolyte membrane (i.e., $[M^{n+}]/[H^+]$) becomes approximately equal to or larger than the concentration ratio outside the electrolyte membrane. Therefore, by optimizing the immersion time and the concentration ratio of the cations ($M^{n+}$) in the solution, the concentration ratio of cations ($M^{n+}$) in the electrolyte membrane can be appropriately controlled. Also, immersing the electrolyte membrane for an extended period of time in the solution containing an excessive amount of cations ($M^{n+}$) to protons in the solution enables almost all of the cations ($M^{n+}$) in the solution to be replaced by the protons in the electrolyte membrane. Further, making the amount of cations ($M^{n+}$) in the solution excessive with respect to the amount of protons in the solution as well as more than the amount of positive ion exchange groups of the electrolyte membrane enables almost all of the protons in the electrolyte membrane to be replaced with the cations ($M^{n+}$). Moreover, optimizing the immersion time in the solution enables ion exchange to be performed only near the surface of the membrane or enables ion exchange to be performed substantially evenly to the inside of the membrane.

A second method impregnates porous material (such as filter paper) having a predetermined shape with a solution containing a predetermined amount of a predetermined cation ($Mn^+$) and places the porous material in contact with all or a specific portion of the electrolyte membrane for a predetermined period of time. This method can also be used as a method for performing ion exchange with the entire electrolyte membrane, but is particularly preferably as a method for performing ion exchange with only a portion of the electrolyte membrane or a method for changing the ion exchange rates of the power generating region and the non-power generating region or the band region. In this case as well, optimizing the concentration ratio and contact time of the cations ($M^{n+}$) in the solution enables the concentration ratio of the cations ($M^{n+}$) in the solution to be appropriately controlled. Also, optimizing the contact time with the porous material enables ion exchange to be performed only near the surface of the membrane or enables ion exchange to be performed substantially evenly to the inside of the membrane.

The solid polymer electrolyte membrane containing an organo-metalloxane polymer can be produced according to any one of the following methods.

A first method impregnates the electrolyte membrane with water in advance, then places the electrolyte membrane into contact with a solution that contains organo-metalloxane monomers (and metalloxane monomers when necessary), and heats the electrolyte membrane.

A second method impregnates the electrolyte membrane with organo-metalloxane monomers (and metalloxane monomers when necessary) in advance, then places the electrolyte membrane in contact with water, and heats the electrolyte membrane.

A third method places the electrolyte membrane in contact with a solution containing water and organo-metalloxane monomers (and metalloxane monomers when necessary), and then heats the electrolyte membrane. This third method is effective when the dehydro-polycondensation rate of the organo-metalloxane monomers (and metalloxane monomers) is relatively slow.

With any of the these methods, the organo-metalloxane monomers (and metalloxane monomers) introduced into the membrane hydrolyze on contact with water and the alkoxy group is replaced with a hydroxyl group. Also, when the organo-metalloxane monomers are introduced into the membrane, ion exchange takes place between the ammonium cations or class four alkylammonium cations at the terminus and the protons in the membrane. Moreover, when this membrane is then heated, the hydroxyl group dehydro-condenses and metalloxane bonds ($M_1$-O-$M_2$) form. As a result, organo-metalloxane polymers form inside the electrolyte membrane. Also, organo-metalloxane polymers ion bond with positive ion exchange groups in the membrane via the ammonium cation or class four alkylammonium cation at the terminus.

Specific methods for placing the electrolyte membrane in contact with a solution containing water and/or organo-metalloxane monomers (and metalloxane monomers when necessary) include:

(1) a first method for immersing the entire membrane in the solution for a predetermined period of time; and (2) a second method for impregnating porous material (such as filter paper) having a predetermined shape with the solution and then placing this porous material in contact with the entire membrane or a specific portion of the membrane for a predetermined period of time.

In this invention either method may be used. In particular, the second method is particularly preferable as a method for introducing organo-metalloxane polymers only into part of the electrolyte membrane or as a method for changing the amount of organo-metalloxane polymers introduced into the power generating region and the non-power generating region, or the band region.

The amount of organo-metalloxane polymers introduced into the membrane can be appropriately controlled by the concentration of the organo-metalloxane monomers in the solution and the contact time with this solution. Also, optimizing the contact time with the solution enables organo-metalloxane polymers to be introduced only near the surface of the membrane or enables organo-metalloxane polymers to be introduced substantially evenly to the inside of the membrane.

Only ion exchange may be performed or only organo-metalloxane polymers may be introduced, or both ion exchange may be performed and organo-metalloxane polymers introduced. Also, when both ion exchange is performed and organo-metalloxane polymers are introduced, the order is not important (i.e., either may be performed first).

Next, electrodes are joined to both sides of an electrolyte membrane which has undergone ion exchange and/or into which organo-metalloxane polymers have been introduced. Specific method for joining the electrodes include:

(1) a first method of applying a paste that includes an electrolyte in the catalyst layer and an electrode catalyst (hereinafter this paste will be referred to as "catalyst paste") to both sides of the electrolyte membrane;

(2) a second method for applying the catalyst paste to a surface of an appropriate substrate (such as a polytetrafluoroethylene sheet) and transferring that onto both sides of the electrolyte membrane;

(3) a third method of, after forming the catalyst layer on both sides of the electrolyte membrane by either the first or the second method, additionally joining a diffusion layer to both sides; and (4) a fourth method of applying the catalyst paste to a surface of diffusion layers and joining the diffusion layers via the catalyst layers to both sides of the electrolyte membrane.

The polymer electrolyte membrane fuel cell according to the invention can be obtained by making an unit cell by sandwiching both sides of an MEA obtained in this manner between separators having gas passages and stacking together a predetermined number of these single cells.

Next, the operation of the MEA, the MEA manufacturing method, and the polymer electrolyte membrane fuel cell according to the invention will be described.

[1. Improving the Coefficient of Elasticity by Ion Exchange]

It is said that multiplets of anions (such as sulphonate anions) of a positive ion exchange group and ion pairs of cations concentrate in the electrolyte membrane, forming a region formed only of ions (i.e., an ionic associate). The strength of the bond of this ionic associate is determined by the electrostatic attraction force of the cations and anions, and the electrostatic attraction force is thought to change depending on the radii of the cations and anions as well as the ratio of those radii. Therefore, it is thought that the strength of the bond of the ionic associate and thus the coefficient of elasticity of the membrane can be changed by changing the type of cation.

Among the various cations described above, the following are greatly effective in improving the coefficient of elasticity.
 (1) complex cations such as hexa ammine cobalt (III) ions;
 (2) high valence cations such as $Ce^{4+}$; and
 (3) cesium ions ($Cs^+$), calcium ($Ca^{2+}$), strontium ions ($Sr^{2+}$), barium ions ($Ba^{2+}$), zirconyl ions ($ZrO^{2+}$), chrome (III) ions ($Cr^{3+}$), and cerium (III) ions ($Ce^{3+}$).

In particular, the increase rate of the coefficient of elasticity when ion exchange is performed with complex ions is above all others. Therefore, replacing some of the protons in the electrolyte membrane with these cations improves the coefficient of elasticity of the electrolyte membrane, which suppresses degradation of the membrane that is caused by mechanical stress. Also, optimizing the ion exchange rate at this time improves the coefficient of elasticity of the membrane without greatly reducing the electrical conductivity of the membrane.

[2. Improving the Coefficient of Elasticity by Introducing Organo-Metalloxane Polymers]

If the electrolyte membrane is impregnated with a silicate ester such as tetraethoxysilane and the silicate ester is then hydrolyzed and polycondensed within the electrolyte membrane, silica (a siloxane polymer) can be introduced into the membrane. When silica is introduced into the membrane, the strength of the membrane increases. However, because silica is considered to simply be bound to a positive ion exchange group in the membrane by a hydrogen bond, the increase rate of the coefficient of elasticity by introducing silica is relatively small.

In contrast to this, if the electrolyte membrane is impregnated with an organo-metalloxane monomer having an ammonium cation or a class four alkylammonium cation at its terminus and the organo-metalloxane monomer is hydrolyzed and polycondensed within the electrolyte membrane, not only is an organo-metalloxane polymer formed inside the membrane, but the positive ion exchange group in the membrane and the ammonium cation or the class four alkylammonium cation at the terminus of the polymer are strongly bonded together by an ionic bond. Therefore, the coefficient of elasticity of the membrane is thought to significantly improve compared to a case in which silica is introduced.

[3. Improving Chemical Resistance]

Although exactly why the chemical resistance of the MEA improves with the method according to the invention is unknown, it is thought to be attributed to the following mechanisms.

A first mechanism is one in which the cations or polymers introduced into the membrane work as sacrificial agents against an attack by radicals and the like on polymer molecules, and thus inhibit the breakup of polymer molecules by themselves being depleted. When Fenton's test is conducted on a membrane that has been strengthened by a predetermined method, there is almost no decrease in weight with the first test, but when Fenton's test is repeatedly conducted on the same membrane, the decrease in weight sometimes increases after the second test. This is thought to indicate that the cations or polymers that were introduced into the membrane are working as sacrificial agents with respect to the radicals. Examples of cations or polymers strongly displaying this kind of phenomenon include:
 (1) tetraethylammonium cations or class four alkylammonium cations having a bulk equal to or greater than that of tetraethylammonium cations; and
 (2) organo-metalloxane polymers having an ammonium cation or a class four alkylammonium cation at the terminus.

A second mechanism is one in which the cations introduced into the membrane work as catalysts to inactivate hydrogen peroxide or peroxide radicals to inhibit the breakup of polymer. When Fenton's test is conducted on a membrane that has been strengthened by a predetermined method, there are cases where there is almost no decrease in weight not only on the first test, but even when Fenton's test is repeated on the same membrane. This is thought to be either because (a) the cations are functioning as catalysts that actively breakup the hydrogen peroxide in a manner that does not generate radicals, or (b) the cations are functioning as catalysts that trap radicals.

Examples of cations strongly displaying the foregoing phenomenon include:
 (1) zirconyl ions, aluminum ions, chrome (III) ions, cerium (III) ions;
 (2) high valence cations such as cerium (IV) ions; and
 (3) complex cations such as hexa ammine cobalt (III) ions.

[4. Improving Mechanical Strength Characteristics and Chemical Resistance by Reducing the Moisture Content]

Hydration energy is a criterion indicating stability when cations are surrounded by water. High hydration energy means that those cations easily bond with the water. It is thought that the moisture content of the electrolyte membrane is lower the less hydration energy there is per one cation in the electrolyte membrane.

Hydration energy is thought to have a correlation with electrostatic attraction force between the cations and the water, in which the hydration energy decreases the larger the size of the cations and increases the larger the valence of the cations. However, when the ion exchange rate is the same and the valence of the cations doubles, the number of cations introduced into the electrolyte membrane falls by half, and when the valence of the cations triples, the number of cations introduced into the electrolyte membrane falls to one third. That is, the effect of the valence on the hydration energy of the entire electrolyte membrane cancels out so the hydration energy of the entire electrolyte membrane is thought to mainly rely on the size of the cations. Therefore, replacing the protons which are the smallest conceivable cations with larger cations enables the hydration energy of the entire electrolyte membrane, and thus the moisture content of the electrolyte membrane, to be reduced.

Examples of cations and polymers having an effect of significantly reducing the moisture content of the membrane include:
 (1) class four alkylammonium cations such as tetrapropylammonium cations and tetrabutylammonium cations;
 (2) complex cations such as hexa ammine cobalt (III) cations;

(3) organo-metalloxane polymers having an ammonium cation or a class four alkylammonium cation at the terminus; and (4) organo-metalloxane polymers obtained by hydrolyzing and polycondensing a metalloxane monomer having a hydrophobic group at the terminus and a organo-metalloxane monomer having an ammonium cation or a class four alkylammonium cation at the terminus.

Typically in a humid environment, the initial coefficient of elasticity of the electrolyte membrane decreases significantly. This is thought to be due to the fact that water enters between molecules in the electrolyte membrane which causes van der Waals' forces between molecules to weaken and breaks down the structure of the ionic associate. Here the term "initial coefficient of elasticity" refers to the coefficient of elasticity obtained from the inclination of the tangential line that passes through the point of origin of a distortion-stress curve.

In contrast, if the moisture content of the electrolyte membrane is reduced, the reduction in the initial coefficient of elasticity in a humid environment can be mitigated. This is thought to be because reducing the moisture content of the electrolyte membrane makes it easier to maintain the structure in a dry state even in a humid environment.

Furthermore, reducing the moisture content of the electrolyte membrane improves the chemical resistance of the electrolyte membrane. This is thought to be because reducing the moisture content inhibits chemical species that attack polymer molecules from permeating the entire electrolyte membrane. Therefore, optimizing the content of cations or polymers having an effect of reducing the moisture content improves the mechanical characteristics and chemical resistance of the membrane without greatly reducing the electrical conductivity of the membrane.

[5. Improving the Durability by Reinforcing the Non-Power Generating Region]

Introduction of organo-metalloxane polymers and ion exchange with the various cations described above do improve chemical resistance and mechanical characteristics of the membrane but they also reduce the number of positive ion exchange groups of the electrolyte membrane as well as reduce the electrical conductivity of the membrane.

On the other hand, degradation of the electrolyte membrane due to mechanical and chemical causes is more significant in the non-power generating regions (particularly single-sided catalyst regions) than in the power generating region. Also, non-power generating regions are regions that contribute almost not at all to power generation. Therefore, there is no adverse affect on power generating performance even if all of the protons therein are ion exchanged with a predetermined cation or if enough organo-metalloxane polymers are introduced to ionically bond all of the positive ion exchange groups to ammonium cations or class four alkylammonium cations. Rather, durability increases the higher the ion exchange rate so by reinforcing at least the non-power generating region, the durability of the MEA can be drastically improved without sacrificing power generating performance.

[6. Improving Durability by Reinforcing the Band Region that Includes a Single-Sided Catalyst Region]

Degradation of the electrolyte membrane which constitutes the MEA is remarkable at the end portion of the catalyst layer. The mechanism of this degradation is not entirely clear but it is estimated to be due to a combination of the following.

(1) The end portion of the catalyst layer is the boundary between the region that swells from water produced when electricity is discharged and a region that does not so mechanical stress tends to concentrate there.

(2) If the electrodes are off even slightly with respect to one another when the MEA is manufactured, a single-sided catalyst region is formed on the end portion of the catalyst layer, and this single-sided catalyst region is more prone to chemical degradation than other regions. This is the first time the inventors have found significant chemical degradation in the single-sided catalyst region.

Therefore, if the band region which is the center portion of the electrolyte membrane and near the end portion of the catalyst is reinforced beforehand, it is possible to inhibit degradation of the membrane caused by mechanical stress that occurs in the end portion of the catalyst layer.

Also, even if a single-sided catalyst region is produced due to error in the manufacturing process, that single-sided catalyst region can be reliably made to fit within the band region by optimizing the width of the band region. As a result, chemical degradation in the single-sided catalyst region can be suppressed.

Further, optimizing the width of the band region enables adverse effects on the power generating performance of the MEA to be kept to a minimum even if all of the protons in the band region are ion exchanged with a predetermined cation or if enough organo-metalloxane polymers are introduced to ionically bond all of the positive on exchange groups to ammonium cations or class four alkylammonium cations. Therefore, the durability of the MEA greatly improves while maintaining substantially the same power generating performance.

EXAMPLES 1 to 8

Electrolyte membranes measuring 8 cm×8 cm (Nafion (registered trademark) 112, approximately 0.7 g) were immersed overnight in various aqueous solutions containing various cations. The concentration of each solution was at least 0.2 M and the amount of each solution was 0.2 L. This corresponds to exchanging all of the protons of a sulphonate group in the membrane with cations using aqueous solutions containing an excess of cations.

EXAMPLE 9

An 8 cm×8 cm electrolyte membrane (Nafion (registered trademark) 112, approximately 0.7 g) was immersed overnight in 0.2 L of N-trimethoxysilylpropyl-N,N,N-trimethylammonium chloride ((TMSiTMA)Cl) 0.2 M methanol aqueous solution. The obtained membrane was then immersed for 10 minutes in distilled water, after which it was vacuum dried for two hours at 130 degrees Celsius (Sol-Gel+ion exchange method). This process corresponds to an ion exchange rate of 100%.

COMPARATIVE EXAMPLE 1

An 8 cm×8 cm electrolyte membrane (Nafion (registered trademark) 112, approximately 0.7 g) was immersed for five hours in 67 vol % methanol aqueous solution. Then the membrane was immersed for 10 minutes in 40 vol % tetraethoxysilane (TEOS) methanol solution, after which it was vacuum dried for two hours at 130 degrees Celsius (Sol-Gel method).

COMPARATIVE EXAMPLE 2

An 8 cm×8 cm electrolyte membrane (Nafion (registered trademark) 112, approximately 0.7 g) was immersed overnight in distilled water and then directly tested.

The initial coefficient of elasticity, moisture content, and fluorine ion ($F^-$) dissolution rate were then measured for each of the membranes obtained in Examples 1 to 9 and Comparative examples 1 and 2. The method of measurement is as follows.

(1) The initial coefficient of elasticity in 95 degree Celsius water was measured as follows. A piece of electrolyte membrane having a width of 5 mm and a length of 20 mm was stretched at a rate of 2 mm/s in the length direction in 95 degree Celsius water and the distortion-stress curve was measured. The initial coefficient of elasticity was then obtained by performing fitting on this distortion-stress curve with a straight line that passes through the point of origin.

(2) The moisture content was measured as follows. An electrolyte membrane was cutout and its dry weight measured. Then after immersing it in distilled water for at least 10 hours at room temperature, the excess moisture was wiped off and its weight measured again. The moisture content was obtained by dividing the change in weight by the dry weight.

(3) The fluorine ion dissolution rate in Fenton's test is measured as follows. The membrane was first kept for eight hours in 1 wt % hydrogen peroxide solution of 100 degrees Celsius in which 10 ppm of $Fe^{2+}$ had been dissolved. Then the concentration of the $F^-$ in the solution was measured with an $F^-$ selective electrode, and the $F^-$ dissolution rate per unit time and unit area of the electrolyte membrane was then obtained from the obtained $F^-$ concentration. The results are shown in FIG. 3.

Here, the letter A indicates a treatment by ion exchange, the letter B indicates a process by Sol-Gel and ion exchange, and the letter C indicates a treatment by Sol-Gel.

As is apparent from FIG. 3, in all of the examples and comparative examples except for the cases in which tetrapropylammonium cations (i.e., Example 5) and TEOS (i.e., Comparative example 1) were used, the initial coefficient of elasticity improves from Comparative example 2 in which water was used. When $Ce^{4+}$ cations are used (i.e., Example 4), the initial coefficient of elasticity is better than it is when $Ce^{3+}$ cations are used (i.e., Example 3). When hexa ammine cobalt (III) cations are used (i.e., Example 1), the initial coefficient of elasticity improves dramatically. When (TMSiTMA)Cl is used (i.e., Example 9), the initial coefficient of elasticity improves drastically compared with the case in which TEOS was used (i.e., Comparative example 1).

The marked improvement in the initial coefficient of elasticity from using high valence cations or complex cations is thought to be because the strength of the ionic associate improved because the ratio of the radius of the cations to the radius of the anions was optimized. Also, the marked improvement in the initial coefficient of elasticity from using (TMSiTMA)Cl is thought to be because an ion bond is formed between the class four alkylammonium cation at the terminus and the positive ion exchange group in the membrane.

Also as evident from FIG. 3, when hexa ammine cobalt (III) cations (i.e., Example 1) or tetrapropylammonium cations (i.e., Example 5) are used, the moisture content of the membrane decreases significantly compared with when other cations are used. When (TMSiTMA)Cl is used (i.e., Example 9), the moisture content of the membrane decreases significantly compared with when TEOS is used (i.e., Comparative example 1). This significant decrease in moisture content from using a specific cation or (TMSiTMA)Cl is thought to be because the hydration energy of the entire membrane is lower.

Moreover as is evident from FIG. 3, in all of the examples and comparative examples except for the cases in which $Na^+$ cations (i.e., Example 6), $Mg^{2+}$ cations (i.e., Example 7), and TEOS (i.e., Comparative example 1) were used, the $F^-$ dissolution rate improves from Comparative example 2 in which water was used. When $Ce^{4+}$ cations are used (i.e., Example 4), the $F^-$ dissolution rate drops compared to a case in which $Ce^{3+}$ cations are used (i.e., Example 3). In particular, when hexa amine cobalt (III) cations (i.e., Example 1), $Ce^{3+}$ cations (i.e., Example 3), or $Ce^{4+}$ cations (i.e., Example 4) are used, the $F^-$ dissolution rate drops dramatically. When tetrapropylammonium cations (i.e., Example 5) or (TMSiTMA)Cl (i.e., Example 9) is used, the $F^-$ dissolution rate drops drastically compared with Comparative example 2.

The reason for this large drop in the $F^-$ dissolution rate from specific cations or (TMSiTMA)Cl is thought to be 1) because a specific cation inactivated hydrogen peroxide or its radicals, 2) because a specific cation acted as a sacrificial agent against the radicals, or 3) because radicals permeate the membrane due to the drop in moisture content.

EXAMPLES 10 and 11

Ion exchange was performed according to a procedure like that in Examples 1 to 8 except for that $[Pt(NH_3)_4]Cl_2$ (i.e., Example 10) or $[Ru(NH_3)_6]Cl_3$ (i.e., Example 11) was used as the test reagent to perform ion exchange with the protons. The initial coefficient of elasticity of the obtained membrane was measured under the same conditions as it was in Examples 1 to 8. The results are shown in FIG. 4. FIGS. 3 and 4 show that complex cations significantly improve the initial coefficient of elasticity compared to other cations.

EXAMPLE 12

A 6×6 cm electrolyte membrane (Nafion (registered trademark) 112) was prepared and immersed in an aqueous solution of hexa ammine cobalt (III) chloride ($[Co(NH_3)_6]Cl_3$) containing 1/30 of the amount of hexa ammine cobalt cations of a sulphonate group in this electrolyte membrane for at least 10 hours. When all of the hexa ammine cobalt ions in the solution replace protons in the sulphonate group, 10% of the protons in the entire region of the electrolyte membrane will have been ion exchanged with hexa ammine cobalt ions. In reality, upon measuring the amount of protons in the electrolyte membrane after treatment, the ion exchange rate was 9.9%. Next, an MEA was produced by hot pressing a 3×3 cm square catalyst layer to both sides of the electrolyte membrane. The positions of the anode and cathode were intentionally offset as shown in FIG. 1. The offset width was 1 mm in the x direction and 1 mm in the y direction. Also, the hot pressing was performed by maintaining a weight of 50 kgf/cm² (4.9 MPa) at 120 degrees Celsius for six minutes.

EXAMPLES 13 and 14

An MEA was produced according to the same procedures as in Example 12 except for the fact that a cerium sulphate (IV) ($Ce(SO_4)_2$) aqueous solution (Example 13) or a tetra-n-propylammonium-hydroxide ($[(CH_3CH_2CH_2)_4N]OH$) aqueous solution (Example 14) in which 10% of the protons in the entire region of the electrolyte membrane can be ion exchanged was used as the solution to treat the membrane.

EXAMPLE 15

A 6×6 cm electrolyte membrane (Nafion (registered trademark) 112) was immersed overnight in a methanol solution (concentration 50 wt %) of (TMSiTMA)Cl of a concentration that enables 10% of the protons in the entire region of the electrolyte membrane to be ion exchanged. Then the electrolyte membrane was immersed in distilled water for 10 minutes, after which it was vacuum dried for two hours at 130 degrees Celsius. An MEA was then produced according to the same procedures as in Example 12.

COMPARATIVE EXAMPLE 3

An MBA was produced according to the same procedures as in Example 12 except for the fact that distilled water was used as the solution to treat the membrane.

REFERENCE EXAMPLES 1 and 2

An MEA was produced according to the same procedures as in Example 1 except for the fact that a magnesium sulphate ($Mg(NO_3)_2$) aqueous solution (Reference example 1) or a cerium sulphate (III) ($Ce_2(SO_4)_3$) aqueous solution (Reference example 2) of a concentration that enables 10% of the protons in the entire region of the electrolyte membrane to be ion exchanged was used as the solution to treat the membrane.

EXAMPLE 16

A 3×3 cm square hole was cut out of 6×6 cm square filter paper and covered from one side by a 6×6 cm electrolyte membrane (Nafion (registered trademark) 112). Then the filter paper was immersed in 2 mL of a 0.1 M aqueous solution of hexa ammine cobalt (III) chloride ($[Co(NH_3)_6]Cl_3$). A weight was then placed on top so that the electrolyte membrane and the filter paper would be in sufficiently contact with one another. It was then left in this state for at least 10 hours. A 3×3 cm square cathode catalyst sheet was then positioned so that it fit correctly over the square hole in the filter paper and an electrode catalyst was transferred by hot pressing. The hot pressing was performed by maintaining a weight of 50 kgf/cm$^2$ (4.9 MPa) at 120 degrees Celsius for six minutes.

Next, the strengthening process and the transferring of the anode catalyst layer were performed in the same manner on the other side of the electrolyte membrane.

The positions of the anode and cathode were intentionally offset as shown in FIG. 1. The offset width was 1 mm in the x direction and 1 mm in the y direction. Also, the ion exchange rate in the non-power generating region was 100%.

EXAMPLE 17

A 2.3×2.3 cm square hole was cut out of 3.7×3.7 cm square filter paper and covered from one side by a 6×6 cm electrolyte membrane (Nafion (registered trademark) 112). Then the filter paper was immersed in 2 mL of a 0.1 M aqueous solution of hexa ammine cobalt (III) chloride ($[Co(NH_3)_6]Cl_3$). A weight was then placed on top so that the electrolyte membrane and the filter paper would be in sufficiently close contact with one another. It was then left in this state for at least 10 hours. Also, a strengthening process was performed in the same position on the other side as well.

Then, a 3×3 cm square catalyst layer was then hot pressed so that the single-sided catalyst region was near the center of the band region that had been strengthened by the strengthening process (see FIG. 2). The hot pressing was performed by maintaining a weight of 50 kgf/cm$^2$ (49 MPa) at 120 degrees Celsius for six minutes.

The positions of the anode and cathode were intentionally offset as shown in FIG. 2. The offset width was 1 mm in the x direction and 1 mm in the y direction. Also, the ion exchange rate in the band region was 100%.

A durability test was performed according to the following procedures for the MEAs obtained in Examples 12 to 16, Comparative example 1, and Reference Examples 1 and 2.

First, an MEA (an electrode membrane-catalyst layer assembly) was sandwiched between diffusion layers measuring 3.6×3.6 cm each so that the outer periphery of the catalyst layer was positioned within the outer periphery of the diffusion layers. Further, both surfaces of the MEA including the diffusion layers were then sandwiched between a 3.6×3.6 cm collector to which a weight of 820 N was then applied. Then the cell temperature was raised to 90 degrees Celsius and hydrogen with 20% humidity was delivered at a flowrate of 0.1 L/min to the anode side and oxygen with 33% humidity was delivered at the same flowrate of 0.1 L/min to the cathode side.

In this state, an open circuit state was maintained for three minutes and then a state in which the current value was controlled to 0.1 A/cm was maintained for one minute. These two states were repeated alternately. During the durability test, the hydrogen content (which corresponds to the gas cross leak amount) in the exhaust as on the cathode side was measured and the test was ended when it exceeded 500 ppm. FIG. 5 shows the endurance time (the time for which the hydrogen content exceeded 500 ppm).

The MEAs of Examples 12 to 17 and Reference examples 1 and 2 all had better durability than Comparative example 1 in which the MEA was not treated. The MEAs of Examples 12 to 15 each have a durability at least 1.5 times that of the MEA of Comparative example 1, even with an ion exchange rate of only 10%. The MEA in which ion exchange was performed with $Ce^{4+}$ (high valence cations) (i.e., Example 13) has better durability than the MEA in which ion exchange was performed with $Ce^{3+}$ (i.e., Reference example 2). In particular, the hexa ammine cobalt (III) cations (i.e., Example 12) was very effective in improving the durability of the MEA.

Even with the MEA in which ion exchange was performed with tetrapropylammonium cations (Example 14), which had almost no effect in improving the coefficient of elasticity, the reason for the improved durability is thought to be because the ion exchange reduced the moisture content which inhibited swelling and shrinking of the membrane following periods of power generation and periods of rest during the durability test, and also inhibited radicals from entering the membrane.

Also, the reason that the improvement in durability of the MEA in which ion exchange was performed with $Mg^{2+}$ (i.e., Reference example 1) was so slight is thought to be because the effect of $Mg^{2+}$ on the durability is relatively small and the ion exchange rate is relatively small.

Also, as is evident from FIG. 5, the durability of the MEA in which only the non-power generating region (i.e., Example 16) or the band region (i.e., Example 17) was strengthened was higher than the durability of the MEA in which the entire membrane was strengthened. This is because the ion exchange rate of the non-power generating region or the band region that includes the single-sided catalyst region is higher than it is when the entire membrane is strengthened. Also, these results indicate that among the MEAs, degradation in the single-sided catalyst region is significant and durability of the MEA is significantly increased by strengthening this single-sided catalyst region.

Although example embodiments of the invention have been described in detail, the invention is not limited in any way to these example embodiments. To the contrary, various modifications may also be made without departing from the scope of the invention.

For example, in the foregoing example embodiments, the membrane is strengthened before either of the catalyst layers is joined to it. Alternatively, however, the band region or non-power generating region that includes the single-sided catalyst region may also be strengthened after the catalyst layers have been joined to the membrane.

While the invention has been described with reference to exemplary embodiments thereof, it should be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

The invention claimed is:

1. A membrane electrode assembly comprising:
a solid polymer electrolyte membrane; and
an electrode joined to each of two sides of the solid polymer electrolyte membrane,
wherein the solid polymer electrolyte membrane is such that some protons are ion exchanged with ammine complex cations, and
the solid polymer electrolyte membrane includes an organo-metalloxane polymer obtained by impregnating the solid polymer electrolyte membrane with a solution that includes an organo-metalloxane monomer having one cation from among an ammonium cation and a class four ammonium cation at a terminus thereof, and hydrolyzing and polycondensing the organo-metalloxane monomer.

2. The membrane electrode assembly according to claim 1, wherein
said electrode joined to each of two sides of the solid polymer electrolyte membrane includes a catalyst layer, and
said protons are included in a non-power generating region, which is an outer peripheral portion of the solid polymer electrolyte membrane and in which the catalyst layer is not formed on at least one side.

3. The membrane electrode assembly according to claim 1, wherein
said electrode joined to each of two sides of the solid polymer electrolyte membrane includes a catalyst layer, and
said protons are included in a band region, which is a middle portion of the solid polymer electrolyte membrane and includes therein an outer periphery of the catalyst layer.

4. A polymer electrolyte membrane fuel cell comprising:
the membrane electrode assembly according to claim 1.

5. The membrane electrode assembly according to claim 1, wherein the ammine complex cations are chosen from hexa ammine cobalt (III) cations ($[Co(NH_3)_6]^{3+}$), tetra ammine platinum (II) cations ($[Pt(NH_3)_4]^{2+}$), hexa ammine ruthenium (III) cations ($[Ru(NH_3)_6]^{3+}$), and hexa ammine platinum (IV) cations ($[Pt(NH_3)_6]^{4+}$).

6. A membrane electrode assembly comprising:
a solid polymer electrolyte membrane; and
an electrode joined to each of two sides of the solid polymer electrolyte membrane,
wherein the solid polymer electrolyte membrane includes an organo-metalloxane polymer obtained by impregnating the solid polymer electrolyte membrane with a solution that includes an organo-metalloxane monomer having one cation from among an ammonium cation and a class four ammonium cation at a terminus thereof, and hydrolyzing and polycondensing the organo-metalloxane monomer.

* * * * *